United States Patent [19]

Garner

[11] 4,333,845

[45] Jun. 8, 1982

[54] COATING COMPOSITION THINNER FOR DECREASING POLLUTION RESULTING FROM THE APPLICATION OF A COATING COMPOSITION

[75] Inventor: James W. Garner, Farmington Hills, Mich.

[73] Assignee: Grow Group, Inc., New York, N.Y.

[21] Appl. No.: 185,326

[22] Filed: Sep. 8, 1980

Related U.S. Application Data

[60] Division of Ser. No. 932,948, Aug. 11, 1978, Pat. No. 4,265,944, which is a continuation-in-part of Ser. No. 739,203, Nov. 8, 1976, abandoned.

[51] Int. Cl.$^3$ .......................... C09D 9/00; C11D 7/50
[52] U.S. Cl. ..................................... 252/170; 252/364; 252/DIG. 8
[58] Field of Search .................. 252/162, 174.21, 170, 252/364, DIG. 8

[56] References Cited

U.S. PATENT DOCUMENTS

| | | |
|---|---|---|
| 503,133 | 8/1893 | Goetz . |
| 1,138,081 | 5/1915 | Carrier . |
| 1,749,920 | 3/1930 | Modave . |
| 1,966,280 | 7/1934 | Bingman . |
| 2,066,913 | 1/1937 | Schmieg . |
| 2,086,514 | 7/1937 | Saunders et al. . |
| 2,188,439 | 1/1940 | Kirkpatrick . |
| 2,232,561 | 2/1941 | Richards . |
| 2,289,537 | 7/1942 | Bright . |
| 2,372,085 | 3/1945 | Jones et al. . |
| 2,395,960 | 3/1946 | Clark et al. . |
| 2,407,255 | 9/1946 | Cupery . |
| 2,575,276 | 11/1951 | Jacoby . |
| 2,593,548 | 4/1952 | Edwards . |
| 2,604,185 | 7/1952 | Johnstone et al. . |
| 2,618,133 | 11/1952 | Kennedy . |
| 2,668,150 | 2/1954 | Luvisi . |
| 2,694,466 | 11/1954 | Bingman . |
| 2,928,498 | 3/1960 | Schmid-Nisól . |
| 3,170,384 | 2/1965 | Krantz et al. . |
| 3,173,879 | 3/1965 | Arnold et al. . |
| 3,353,800 | 11/1967 | Jens . |
| 3,429,823 | 2/1969 | Catanco . |
| 3,440,803 | 4/1969 | Wechselblatt . |
| 3,463,735 | 8/1969 | Stonebreaker et al. . |
| 3,475,202 | 10/1969 | Bok . |
| 3,551,189 | 12/1970 | Gray et al. . |
| 3,599,399 | 8/1971 | Gallen . |
| 3,633,340 | 1/1972 | Blingworth . |
| 3,635,827 | 1/1972 | Jakobi . |
| 3,667,191 | 6/1972 | Prince et al. . |
| 3,671,465 | 6/1972 | Murphy . |
| 3,686,701 | 8/1972 | Charle et al. . |
| 3,713,872 | 1/1973 | Porter, Jr. et al. . |
| 3,737,386 | 6/1973 | Geiss ................................ 252/162 |
| 3,750,622 | 8/1973 | Repp et al. . |
| 3,751,970 | 8/1973 | Alburger ....................... 252/162 X |
| 3,768,232 | 10/1973 | Barber et al. . |
| 3,807,291 | 4/1974 | Roberts et al. . |
| 3,861,887 | 1/1975 | Forney . |
| 3,867,112 | 2/1975 | Hornerkamp et al. . |
| 3,873,363 | 3/1975 | Bakka et al. . |
| 3,876,399 | 4/1975 | Saponaro . |
| 3,880,620 | 4/1975 | Lange et al. . |
| 3,884,654 | 5/1975 | de Crevoisier et al. . |
| 3,888,641 | 6/1975 | Ito . |
| 3,926,592 | 12/1975 | Leva . |
| 3,932,151 | 1/1976 | Lau . |
| 3,965,805 | 6/1976 | Muehlbauer . |
| 3,967,942 | 7/1976 | Pain et al. . |
| 3,972,824 | 8/1976 | Fooladi . |
| 3,979,535 | 9/1976 | Govindan . |
| 3,985,692 | 10/1976 | Sykes et al. . |
| 3,985,922 | 10/1976 | Thorton et al. . |
| 4,002,490 | 1/1977 | Michalski et al. . |
| 4,005,997 | 2/1977 | Fowler et al. . |
| 4,028,072 | 6/1977 | Braun et al. . |
| 4,052,327 | 10/77 | Arena et al. . |
| 4,054,429 | 10/77 | Ostoyic et al. . |
| 4,067,806 | 1/78 | Mauceri. |
| 4,102,303 | 7/78 | Cordier et al. . |
| 4,102,983 | 7/78 | Yamase et al. . |

FOREIGN PATENT DOCUMENTS

| | | |
|---|---|---|
| 47274 | 4/1974 | Australia . |
| 207554 | 7/1907 | Fed. Rep. of Germany . |
| 726287 | 8/1942 | Fed. Rep. of Germany . |
| 2451157 | 4/1976 | Fed. Rep. of Germany . |
| 2511181 | 9/1976 | Fed. Rep. of Germany . |
| 1029777 | 6/1953 | France . |
| 1192088 | 10/1959 | France . |
| 2289593 | 5/1976 | France . |
| 51-9066 | 1/1976 | Japan . |
| 51-10610 | 4/1976 | Japan . |
| 51-43374 | 4/1976 | Japan . |
| 8600 | 3/1923 | Netherlands . |
| 14622 | 5/1926 | Netherlands . |
| 15448 | 11/1926 | Netherlands . |
| 498,956 | 1/76 | U.S.S.R. |

| | | |
|---|---|---|
| 36714 | 7/1916 | Norway . |
| 129024 | 7/1919 | United Kingdom . |
| 331654 | 7/1930 | United Kingdom . |
| 400054 | 10/1933 | United Kingdom . |
| 573111 | 11/1945 | United Kingdom . |
| 576592 | 4/1946 | United Kingdom . |
| 727828 | 4/1955 | United Kingdom . |
| 973531 | 10/1964 | United Kingdom . |
| 1204181 | 9/1970 | United Kingdom . |
| 1466739 | 3/1977 | United Kingdom . |
| 391842 | 12/1973 | U.S.S.R. . |

OTHER PUBLICATIONS

Encyclopedia of Chemical Technology of Kirk-Othmer, 2nd Ed., vol. 1, pp. 44-59, 171, 175-176 and 627.
Chemical Engineers' Handbook, John H. Perry, 4th Ed., Chapter 18, pp. 53-59.
Chemical Engineers' Handbook, John H. Perry, 5th Ed., p. 14-2.
UCON Handout, pp. 23-48.
Taylor and Gaskin Advertisement Entitled "Air Pollution Control System".
UCON LB Series.
"A Mixed-Substrate Column for Gas Chromatographis Analysis of Paint Thinners and Related Solvent Mixtures" by Roger L. Gatrell, General Motors Research Laboratories.

*Primary Examiner*—Michael R. Lusignan
*Attorney, Agent, or Firm*—Burton, Parker & Schramm

[57] ABSTRACT

Described is a method for decreasing the air pollution resulting from the application of paint by applying an organic solvent based paint and a water miscible organic solvent based thinner to a substrate thereby forming a gaseous effluent comprised of a mixture of air and gaseous organic solvent and gaseous thinner and passing the gaseous effluent into a gas absorbing means comprised of a non-reactive liquid solvent. Also described is a novel completely water miscible organic based solvent thinner.

3 Claims, 2 Drawing Figures

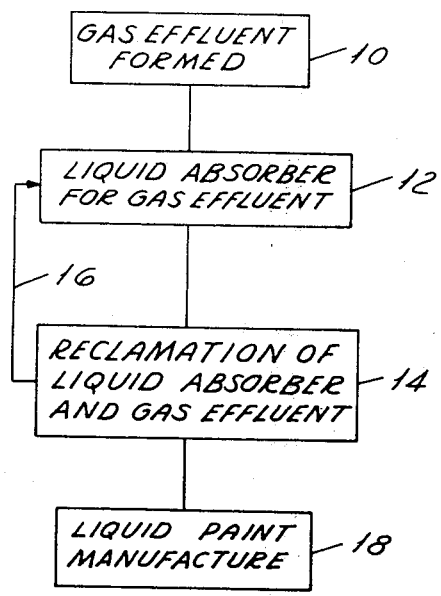
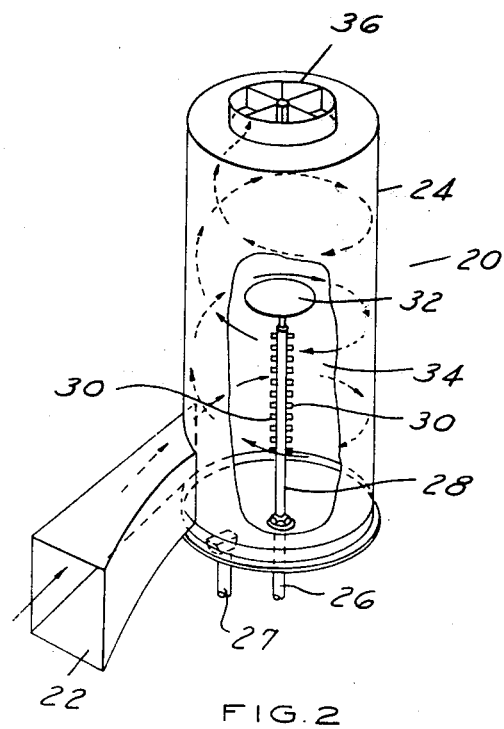

COATING COMPOSITION THINNER FOR DECREASING POLLUTION RESULTING FROM THE APPLICATION OF A COATING COMPOSITION

CROSS-REFERENCE TO RELATED APPLICATION

This is a division, of application Ser. No. 932,948, filed Aug. 11, 1978, now U.S. Pat. No. 4,265,944, patented May 5, 1981.

The parent application is a continuation-in-part of U.S. Ser. No. 739,203, filed Nov. 8, 1976, now abandoned, entitled PROCESS FOR THE PURIFICATION OF GASEOUS EFFLUENT FROM INDUSTRIAL PROCESSES, hereby incorporated by reference.

BACKGROUND OF THE INVENTION

The present invention is directed towards a means for decreasing gaseous pollution resulting from the application of coating compositions. It, therefore, relates to improvements to gaseous pollution, such as air pollution, and more specifically, to the utilization of a water miscible organic based thinner. More specifically, the thinner is utilized to thin or reduce the composition employed as a coating composition during the application of said composition to a substrate.

The coating industry, in particular the paint industry, has gone through a revolution in terms of compositions that may be employed in the application of the coating compositions to various substrates due to the pollution of the atmosphere. Numerous techniques, such as the use of powder coating techniques, high solids coating compositions, reduced organic based coating compositions and the like, are various means for resolving the air pollution problem. All of these techniques require a whole new technology in order to satisfy completely the air pollution authorities. The advantage of the present application is that the known technology related to the application of currently known coating compositions, such as liquid paints used as primers and top coat compositions in the transportation industry, such as the automotive industry, may be utilized. It has been found that by the utilization of a completely water miscible paint thinner or paint reducer, the technology currently known with respect to organic based liquid paint may be employed.

SUMMARY OF THE INVENTION

The present invention is concerned with a method for decreasing air pollution resulting from the application of a coating composition comprising the steps of;

1. applying to a substrate an organic solvent based coating composition containing a completely water miscible organic based thinner composition, thereby forming a gaseous effluent containing a mixture of air and gaseous organic solvent and gaseous thinner; and 2. passing said gaseous effluent into a gas absorbing means containing a non-reactive liquid solvent which can absorb the gaseous organic solvent of the coating composition and the gaseous thinner composition.

While the thinner that may be employed in the present application may be any completely water miscible organic based thinner composition, it is preferred that the thinner or reducer composition be one comprised of;

a. a water miscible compound selected from the group consisting of a saturated aliphatic glycol or a saturated aliphatic glycol ether, both containing at least 3 carbon atoms and a compound containing Formula I:

$$R-O+CH_2(R_1)-O+_nR_2 \quad (I)$$

wherein
R is independently selected from the group consisting of hydrogen, alkyl of from 1 to 4 carbon atoms and —(O)C—CH$_3$;
R$_1$ is independently selected from the group consisting of —CH$_2$, —CH$_2$—CH$_2$—, —CH$_2$—CH(CH$_3$)—, and —CH(CH$_2$OH)—;
R$_2$ is independently selected from the group consisting of alkyl of from 1 to 4 carbon atoms, hydroxyl substituted alkyl of from 1 to 4 carbon atoms and —(O)C—CH$_3$; and
n is a number of from 1 to 4; and mixtures thereof, in an amount ranging from about 10 to about 60 parts by weight (PBW);

b. a water miscible monoalkanol of about 1 to about 8 carbon atoms in an amount of from about 10 to about 60 PBW; and c. a water miscible saturated aliphatic ketone containing up to 12 carbon atoms present in an amount from about 10 to about 50 PBW, the total of a+b+c equaling 100 PBW.

Optionally, other water soluble organic based acids, aldehydes or esters may be employed.

BRIEF DESCRIPTION OF THE DRAWINGS

FIG. 1 is a schematic diagram of the process of the present invention including the use of the solvent by-products;

FIG. 2 is a schematic view of a cyclonic spray scrubber which is a liquid absorber for the gaseous effluent.

DESCRIPTION OF PREFERRED EMBODIMENTS

In the operation of the method of the present invention, any organic solvent based coating composition may be employed, in particular organic based primers and top coat coating compositions that are employed by the transportation industry, specifically the automotive industry. The materials that are generally employed by the automotive industry are liquid paints, such as lacquers, which are oil based paints that form a film by evaporation of the solvent or by congealing from a molten state. In addition, enamels are employed which are oil based paint compositions containing binders that form a film by oxidation or polymerization on exposure to air.

A wide variety of well known coating compositions may be employed, such as epoxy resins, vinyl resins, phenolic, acrylic resins, urethane coatings, silicon resins, amino resins, alkyd resins, and the like. It is to be appreciated that a wide variety of these coating compositions are currently known in the current state of technology. The most preferred coating composition is an acrylic based top coat composition currently employed by the automotive industry. A second preferred coating composition is a high solids urethane coating composition described more completely in U.S. Pat. No. 4,070,509. For suitable epoxy resins, see Federation Series on Coatings Technology, Unit 20, July, 1972; for suitable vinyl resins, see Federation Series on Coatings Technology, Unit 19, April, 1972; for suitable phenolic resins, see Federation Series on Coatings Technology, Unit 18, March, 1971; for suitable acrylic resins, see Federation Series on Coatings Technology, Unit 17, March, 1971; for suitable urethane coatings, see Federation Series on Coatings Technology, Unit 15, July, 1970; for suitable teachings of silicon resins, see Federation Series on Coatings Technology, Unit 14, January, 1970; for suitable teachings on amino resins, see Federation Series on Coatings Technology, Unit 13, December, 1969; for suitable teachings of alkyd resins, see Federation Series on Coatings Technology, Unit 5, March, 1967, all of which are hereby incorporated by reference. Other coatings may also be employed, such as polyesters, polyamides, silicons, polybenzimidazole and the like. Of the above enumerated coatings, the most preferred are the acrylic resins.

In the coating industry today, in particular the paint industry, the organic solvents that are employed in the industry are those that contain a variety of organic materials normally including hydrocarbons that are in the liquid state at ambient temperature and pressure, such as hexane, cyclohexane, heptane and the like. In addition, the organic solvents may also contain aromatic based solvents, such as the benzene based and naphthalene based materials and the alkyl derivatives and hydroxyl derivatives thereof, such as toluene, xylene, and the like, phenol, naphthalene, tetrahydronaphthalene, butyl phenol, bisphenol A or F, ethyl benzene, cumene, acetophenone, methylphenyl carbinol and the like.

The present invention concerns itself with utilization of a paint thinner or a paint reducer which is applied simultaneously with the organic solvent based paint. By "simultaneously" is meant that the thinner and coating composition are pre-blended and applied as though it were one coating composition or paint. By "thinner" is meant a composition which reduces or dilutes or assists in the application of the desired coating composition or paint because it can dissolve or disperse the organic solvent based coating composition. This solvent or thinner is used in an amount from about 10 to about 95 PBW of the total applied composition where the remaining portion of the composition is the organic solvent based coating composition actually being applied.

The thinner or reducer contains a completely water miscible organic based solvent composition. By "completely miscible organic based solvent composition" is meant a composition that is comprised entirely of an organic material, preferably containing just carbon, hydrogen and oxygen atoms, which is a solvent for the organic based coating composition and is soluble in water in its entirety, even though some of the components may not be completely water soluble. Suitable Group (a) thinners are: monoalkyl or dialkyl ether of ethylene glycol or diethylene glycol, or the mono-, di-, or trialkyl ether of triethylene glycol and the acetate derivatives thereof. The alkyl group ranges from 1 to 4 carbon atoms. Suitable examples are saturated glycols containing at least four carbon atoms or is a compound containing Formula I:

R is independently selected from the group consisting of hydrogen, alkyl of from 1 to 4 carbon atoms and —(O)C—CH$_3$;

R$_1$ is independently selected from the group consisting of —CH$_2$, —CH$_2$—CH$_2$—, —CH$_2$—CH(CH$_3$)—, and —CH(CH$_2$OH)—;

R$_2$ is independently selected from the group consisting of alkyl of from 1 to 4 carbon atoms, hydroxyl substituted alkyl of from 1 to 4 carbon atoms and —(O)C—CH$_3$.

A preferred thinner is of Formula II:

wherein

R, R$_2$ and n are as described above; and
R$_4$ is a saturated alkylene group of from 2 to 4 carbon atoms.

Exemplary Group (a) materials are Cellosolve (trademark of Union Carbide for monoethyl ether of ethylene glycol), methyl Cellosolve, butyl Cellosolve, isobutyl Cellosolve, hexyl Cellosolve, Carbitol (trademark of Union Carbide for monoethyl ether of diethylene glycol), butyl Carbitol, hexyl Carbitol, monobutyl ether of propylene glycol, monopropyl ether of propylene glycol, monomethyl ether of propylene glycol, monomethyl ether of dipropylene glycol, butoxytriglycol C$_4$H$_9$O(C$_2$H$_4$—O)$_3$H, methoxytriglycol CH$_3$O(C$_2$H$_4$—O—)$_3$H, ethoxytriglycol C$_2$H$_5$O(C$_2$H$_4$O)$_3$H, 1,butoxyethoxy-2-propanol, diethylene glycol, triethylene glycol, tetraethylene glycol, propylene glycol, dipropylene glycol, tripropylene glycol, polypropylene glycol, having a molecular weight up to about 2000, hexylene glycol, 2 ethyl-1,3-hexane diol; 1,5-pentane diol, ester diol-204 (2,2-dimethyl-3-hydroxypropyl 2,2-dimethyl-3-hydroxyl propionate), and the like.

The water miscible alcohols that may be employed in the present invention have from 1 to 8 carbon atoms, such as methanol, ethanol, propanol, butanol, isobutanol, pentanol, hexanol, heptanol, octanol, methylamyl alcohol and the like.

The water miscible aliphatic ketones that may be employed in the present invention are acetone, methyl ethyl ketone, diethyl ketone, methyl propyl ketone, methyl isobutyl ketone, methoxy acetone, cyclohexanone, methyl n-amyl ketone, methyl isoamyl ketone, ethyl butyl ketone, diisobutyl ketone, isophorone, acetyl acetone (2,4-pentane dione), diacetone alcohol (CH$_3$)$_2$C(OH)CH$_2$C(O)CH$_3$.

It is to be appreciated that other organic based materials may be added to the thinner or reducer in order to impart additional solvency properties to the material. The principal requirement is that these additional optional materials be water miscible. They are generally acids and esters, where the acid contains from 1 to about 6 carbon atoms, such as formic acid, acetic acid, propionic acid, butyric acid, valeric acid and the like.

Suitable esters that may be employed are methyl acetate, ethyl acetate, hexylene glycol diacetate, dimethyl ester of succinic acid, glutaric acid, adipic acid and the like, wherein the number of carbon atoms that may be employed ranges up to about 10.

The gaseous effluent formed from the application of paint not only includes the application of the paint itself, but the volatilization of the solvent from the liquid paint during the drying of the liquid paint. By "gas" is meant to include not only a gas phase effluent, but also an atomized paint overspray formed during the application of the paint to a substrate.

The most preferred gaseous effluent is one that contains solvents in the gas phase for liquid paint which solvents are a mixture of substances, in particular, a hydrocarbon substance and an oxygenated substance.

By "oxygenated" is meant organic solvents such as those for paints that contain oxygen in the molecule of the solvent either as an alcohol, a portion of an acid, an ester, or an ether.

In the application of liquid paint to a substrate, the paint is atomized, such as airless, by air or electrostatically. The paint overspray from the paint spray booth is collected in a water wash by a water curtain. The paint applied to the substrate is then dried by passing it through a heated chamber wherein the solvent is volatilized. During both the application and the drying of the paint, gaseous effluent is formed.

Prior to passing the gaseous effluent to the atmosphere, the effluent is then treated according to one aspect of the process of the present invention which is to sparge or bubble, or pass the gaseous effluent into a liquid absorbing means, such as a liquid absorber which is a solvent for the gaseous effluent.

The liquid absorber with gaseous effluent therein may be retained in a suitable reservoir and may be subsequently collected and reclaimed as desired. The advantage of using a liquid absorbing means is that it can be readily handled, pumped, stored and reclaimed.

By employing the liquid absorbing means of the present invention, one may simplify the total pollution control of an industrial plant. In this manner, there need be no variation to the organic paint systems that are currently employed, for one is concerned not with modification of the paint system itself under this invention, but rather the absorption of the gaseous effluent and the most efficient, economical reclamation of the liquid absorbing means, as well as the organic based solvents.

In the normal operation of a paint spray booth water wash, there is a curtain of water which washes the walls of a painting zone or spray booth. The water may be sprayed onto the walls or somehow collect the paint overspray.

The liquid absorbing means of the present invention is one that is non-reactive with the gaseous effluent. Additionally, the liquid absorbing means may be one that is liquid and is optionally substantially non-volatile at ambient temperatures and pressures, as well as the temperatures and pressures in which the industrial process and reclamation of the organic solvent is operable. Most preferably, the liquid absorbing means is water. It is to be appreciated that some small amount of hydrolysis will take place when an organic ester is part of the thinner and water is the liquid absorbing means.

Other suitable liquid absorbing means are those having a vapor pressure of less than 1 mm Hg pressure at 68° F. (20° C.), most preferably less than 0.01 mm Hg. Examples of said liquid absorbing means are polyoxyalkylene glycol, preferably of the structure HO $+R_3$—O$+_m$H where $R_3$ contains 2 to 4 carbon atoms and m ranges from 2 to 2000 as polyoxyethylene glycol, polyoxypropylene glycol, polyoxybutylene glycol; saturated aliphatic polyols having from 2 to 12 carbon atoms as glycerol, dibasic esters such as the dialkyl (up to 8 carbon atoms per group) esters of saturated aliphatic polycarboxylic acids (up to 10 carbon atoms per acid group), such as dialkyl oxalate, dialkyl malonate, dialkyl succinate, dialkyl glutarate, dialkyl adipate, dialkyl pimelate, dialkyl suberate, dialkyl azelate, dialkyl sebacate and the like; saturated aliphatic ketones such as diacetonealcohol, methyl keptyl ketone; aromatic dicarboxylic acid esters such as dialkyl phthalate of from 4 to 13 carbon atoms per alkyl group as didecyl or dioctyl phthalate and the like; organic phosphate esters as tricresyl phosphate; silicon oils such as silanes or polysiloxanes as dimethyl siloxane polymers and non-reactive mixtures thereof. The term "polyoxyalkylene" is meant to include compounds prepared by reacting ethylene oxide, propylene oxide and/or butyl oxide, together with or without other co-reactants as alcohols, as long as there is at least several $+R_3$—O$+$ repeating linkages.

It is to be appreciated that other non-reactive substances may be added as diluents or viscosity control agents to assist the fluidity of the liquid. An alternative liquid absorbing means is a 50—50 mixture by volume of didecyl phthalate and a polyoxyalkylene glycol (Ucon, LB-65, trademark of Union Carbide) having a vapor pressure of less than 0.01 mm Hg pressure at 68° F. (20° C.).

It is preferred that when the liquid absorbing means is used, one having as low a vapor pressure as possible should be employed. This will allow as little of the liquid to be volatilized as possible during the absorption of paint spray effluent. On the other hand, when water is used as the liquid absorber, the handling of the system is improved because of the affinity for water of all of the components of the system, i.e., the coating composition dissolved in the water miscible thinner.

The overall process of the present invention is described in FIG. 1 wherein the gaseous effluent is formed at 10, which effluent is passed into a liquid absorbing means containing a liquid absorber described herein. The outlet of said liquid absorber permits the absorbed gaseous effluent to be passed to a reclamation zone 14. In the reclamation zone, the liquid absorber is separated from the gaseous effluent. The liquid absorbing means is then recycled by means of line 16 back to the liquid absorber for subsequent utilization therein. The gaseous effluent is primarily solvent in the gas phase obtained from the liquid paint. It may be reprocessed in the manufacture of liquid paint 18.

One type of liquid absorber apparatus that may be used in this invention is described and shown in FIG. 2 which is a schematic diagram of a cyclonic spray scrubber 20 having an air of gaseous inlet 22. The gas passing through inlet 22 is tangentially passed into the cyclonic chamber 24 which has a liquid inlet 26 and a liquid outlet 27. The inlet 26 permits the liquid absorber to be passed through a duct 28 and sprayed through the spray manifold sections 30 comprised of a plurality of nozzles. The top of the spray manifold is a core buster disc 32.

The gas effluent from the industrial process enters through the inlet 22 and circles around the cyclonic chamber coming in direct contact with the sprayed liquid absorber 34, which is a fine division of the liquid absorber permitting a high surface area for the air to come into contact therewith. A very high efficiency is achieved in that substantially all of the gaseous effluent containing undesirable pollutants is absorbed in the liquid phase with the remaining gas exiting through the anti-spin vanes 36. The liquid absorber is then collected at the outlet 27 for subsequent process at the reclamation zone 14. The cyclonic chamber can be manufactured from any metal stable to the gaseous effluent, e.g., stainless steel, glass-lined metal chambers and the like. A series of cyclonic chambers may be used to purify the gaseous effluent in step-wise fashion by passing the effluent from each cyclonic chamber to the next.

Cyclonic spray scrubbers described herein are further described in *Chemical Engineers Handbook*, Fourth Edition, at Pages 18-33 and following.

The reclamation zone is primarily directed towards a means of separating the liquid absorber from the gaseous effluent which is absorbed therein. Any means may be employed to form the separation. Two principal techniques are preferred. One is a vacuum distillation and the second is the utilization of microfiltration. In the vacuum distillation, it is highly preferred that there be a large differential between the boiling point of the liquid absorber and the gaseous effluent absorbed therein. If the differential is at least 200° F., then a high separation efficiency can be achieved.

The most preferred gas scrubber is that described in U.S. Pat. No. 3,971,461, entitled GAS SCRUBBER OF THE WET COLLECTOR TYPE.

When a completely water miscible solvent having the components listed in Formula A was inserted into the gas scrubber described in U.S. Pat. No. 3,971,641, improved gas scrubbing was obtained.

| FORMULA A (liquid at ambient temperature and pressure) | |
| --- | --- |
| Component | PBW |
| Methanol | 10 |
| Isopropyl alcohol | 30 |
| Acetone | 20 |
| Cellosolve Acetate | 30 |
| DBE (mixture of dimethyl esters of succinic acid, glutaric acid and adipic acid) | 10 |

It was found that employing the gas scrubber taught in U.S. Pat. No. 3,971,641 and the liquid absorber being water and the thinner being Formula A with an acrylic paint, the linear velocity of the gaseous effluent should be about 5'/sec, preferably about 1 to about 4'/sec (0.31 meters to 1.22 meters). If the gaseous effluent velocity was substantially increased there may not be sufficient absorption of the effluent by the liquid absorber water. The slowing of the effluent movement significantly increased contact efficiency between the liquid absorber spray and the gaseous effluent.

A more efficient technique for separating the liquid absorber from the gaseous effluent absorbed therein may be through the utilization of membranes which facilitate a microfiltration approach. In other words, membranes are inserted in a conduit through which the liquid passes. A low molecular weight substance will pass therethrough while a higher molecular weight substance will be prevented from passing therethrough. This thereby allows for reclamation of the absorber so it can be reprocessed and used in the overall process.

What is claimed is:

1. A coating composition thinner comprising a completely water miscible organic based solvent capable of dissolving organic solvent based coating compositions comprising;
   a. a water miscible compound selected from the group consisting of a saturated aliphatic glycol or a saturated aliphatic glycol ether, both containing at least 3 carbon atoms and a compound containing Formula I:

$$R-O+CH_2(R_1)-O+_n R_2 \qquad (I)$$

wherein
   R is independently selected from the group consisting of hydrogen, alkyl of from 1 to 4 carbon atoms and —(O)C—CH$_3$;
   R$_1$ is independently selected from the group consisting of —CH$_2$, —CH$_2$—CH$_2$—, —CH$_2$—CH(CH$_3$)—, and —CH(CH$_2$OH)—;
   R$_2$ is independently selected from the group consisting of alkyl of from 1 to 4 carbon atoms, hydroxyl substituted alkyl of from 1 to 4 carbon atoms and —(O)C—CH$_3$; and
   n is a number of from 1 to 4; and mixtures thereof, in an amount ranging from about 10 to about 60 parts by weight (PBW);
   b. a water miscible monoalcohol having from 1 to about 8 carbon atoms, in an amount of about 10 to about 60 PBW; and
   c. water miscible saturated aliphatic ketone of up to 12 carbon atoms in an amount of about 10 to about 50 PBW, the total of a+b+c equaling 100 PBW.

2. The composition of claim 1 further comprising organic based water soluble organic acids or esters in an amount of about 10 to about 50 PBW.

3. The composition of claim 1 wherein component (a) is a compound of Formula II:

$$RO+R_4-O+_n R_2 \qquad (II)$$

wherein
R, R$_2$ and n are described above; and
R$_4$ is a saturated alkylene group of from two to four carbon atoms.

* * * * *